US012599896B2

(12) United States Patent
Xu et al.

(10) Patent No.: US 12,599,896 B2
(45) Date of Patent: Apr. 14, 2026

(54) SOLID HEAT CARRIER CATALYST FOR THERMAL DESORPTION OF ORGANIC MATTER-CONTAMINATED SOIL AND METHOD FOR PREPARING SAME

(71) Applicants: NANJING TECH UNIVERSITY, Nanjing (CN); NANJING GEKOF INSTITUTE OF ENVIRONMENTAL PROTECTION TECHNOLOGY & EQUIPMENT CO., LTD., Nanjing (CN)

(72) Inventors: Haitao Xu, Nanjing (CN); Qijie Jin, Nanjing (CN); Mutao Xu, Nanjing (CN); Chengzhang Zhu, Nanjing (CN); Yao Lu, Nanjing (CN); Wei Yan, Nanjing (CN); Mingbo Li, Nanjing (CN); Jing Song, Nanjing (CN)

(73) Assignees: NANJING TECH UNIVERSITY, Nanjing (CN); NANJING GEKOF INSTITUTE OF ENVIRONMENTAL PROTECTION TECHNOLOGY & EQUIPMENT CO., LTD., Nanjing (CN)

( * ) Notice: Subject to any disclaimer, the term of this patent is extended or adjusted under 35 U.S.C. 154(b) by 476 days.

(21) Appl. No.: 18/144,431

(22) Filed: May 8, 2023

(65) Prior Publication Data

US 2024/0050928 A1     Feb. 15, 2024

(30) Foreign Application Priority Data

Aug. 9, 2022    (CN) .......................... 202210948886.7

(51) Int. Cl.

| | |
|---|---|
| *B01J 23/847* | (2006.01) |
| *B01J 21/04* | (2006.01) |
| *B01J 35/00* | (2024.01) |
| *B01J 35/02* | (2006.01) |
| *B01J 35/30* | (2024.01) |
| *B01J 35/40* | (2024.01) |
| *B01J 35/50* | (2024.01) |
| *B01J 37/00* | (2006.01) |
| *B01J 37/02* | (2006.01) |
| *B01J 37/04* | (2006.01) |
| *B01J 37/08* | (2006.01) |
| *B01J 37/34* | (2006.01) |
| *B09C 1/06* | (2006.01) |
| *B33Y 40/20* | (2020.01) |
| *B33Y 70/10* | (2020.01) |
| *B33Y 80/00* | (2015.01) |
| *B28B 1/00* | (2006.01) |
| *B33Y 10/00* | (2015.01) |

(52) U.S. Cl.
CPC .......... *B01J 23/8472* (2013.01); *B01J 21/04* (2013.01); *B01J 35/30* (2024.01); *B01J 35/40* (2024.01); *B01J 35/50* (2024.01); *B01J 37/0018* (2013.01); *B01J 37/0203* (2013.01); *B01J 37/0207* (2013.01); *B01J 37/0213* (2013.01); *B01J 37/0236* (2013.01); *B01J 37/04* (2013.01); *B01J 37/088* (2013.01); *B01J 37/344* (2013.01); *B09C 1/06* (2013.01); *B33Y 40/20* (2020.01); *B33Y 70/10* (2020.01); *B33Y 80/00* (2014.12); *B28B 1/001* (2013.01); *B33Y 10/00* (2014.12)

(58) Field of Classification Search
CPC ........ B01J 23/8472; B01J 35/30; B01J 35/50; B01J 35/40; B01J 21/04; B01J 37/0018; B01J 37/0203; B01J 37/0207; B01J 37/0213; B01J 37/0236; B01J 37/04; B01J 37/088; B01J 37/344; B33Y 80/00; B33Y 40/20; B33Y 70/10; B09C 1/06
See application file for complete search history.

(56) References Cited

FOREIGN PATENT DOCUMENTS

CN         103658165 A     3/2014

OTHER PUBLICATIONS

Xue et al., Ceramics International, (2019), v.45, p. 2612-2620.*

* cited by examiner

*Primary Examiner* — Yong L Chu
(74) *Attorney, Agent, or Firm* — Oliff PLC

(57) ABSTRACT

A solid heat carrier catalyst for thermal desorption of organic matter-contaminated soil and a method for preparing the same. A hollow alumina ball prepared by 3D printing is taken as a solid heat carrier, copper-nickel-vanadium composite oxide is taken as a catalytic active component, and vinyltriethoxysilane is taken as a masking agent. The ball has a diameter of 30 mm to 60 mm and a thickness of 1 mm to 2 mm. An outer surface of the ball is masked with the vinyltriethoxysilane; then the ball is pierced to make an inner surface thereof connected with the outside through channels; the ball is then immersed in a catalytic active component precursor solution; and finally, drying and calcination are performed to obtain the solid heat carrier catalyst for thermal desorption of organic matter-contaminated soil. This product is widely applicable to the field of thermal desorption of organic contaminants of soil.

9 Claims, 4 Drawing Sheets

SOLID HEAT CARRIER CATALYST FOR THERMAL DESORPTION OF ORGANIC MATTER-CONTAMINATED SOIL AND METHOD FOR PREPARING SAME

TECHNICAL FIELD

The present invention relates to a solid heat carrier catalyst for thermal desorption of organic matter-contaminated soil and a method for preparing the same, falling within fields of environment-friendly catalytic materials and soil remediation.

BACKGROUND

With the rapid development of the economy and urban construction, and the promulgation of relevant policies of China, chemical enterprises have left a large number of organic matter-contaminated sites. These organic matters not only directly cause great harm to soil animals, plants, microorganisms and ecosystems, but also can enter the human body through steam inhalation, skin contact, etc., thereby causing great harm to the human body. The remediation and treatment of soil in the organic matter-contaminated sites have become an inevitable major issue related to people's livelihood in China, and its treatment and remediation need to have great social and economic value.

Research on various remediation technologies and equipment for the organic matter-contaminated sites has been widely carried out in recent years, and relevant research results have also been applied to the remediation of the contaminated sites. A thermal desorption remediation technology, due to its high treatment efficiency, short remediation cycle, wide applicability, etc., is widely applied to sites where soil, sludge, sediment and the like containing volatile and semi-volatile organic contaminants need to be treated. The contaminants that can be treated by thermal desorption include nitrobenzene, poly-brominated diphenyl ethers, chlorobenzene, mercury, polychlorinated biphenyl, polycyclic aromatic hydrocarbon and the like. However, the distribution of the contaminants in the contaminated soil is uneven, and the contaminants often have a high boiling point, and thus a large amount of heat energy needs to be consumed in the treatment process. Organic matters such as benzo[A]anthracene, due to their high molecular weight and boiling points, have a significant increase in energy required for thermal desorption. Patent CN103658165 A points out that a high-temperature exhaust gas produced in the remediation process is the main part of a heat energy loss in a thermal desorption system. For a conventional rotary kiln heating system, when the soil treatment capacity is 25 m³/h, the loss of heat emitted by the high-temperature flue gas is 30% to 60%. While the high-temperature flue gas brings the loss of heat, the problem of difficulty in exhaust gas treatment will also be brought, thereby resulting in an increase in exhaust gas treatment costs. Therefore, how to optimize the thermal desorption system is of great engineering significance in reducing the loss of heat and reducing the disposal costs of the contaminated soil.

SUMMARY

An objective of the present invention is to propose a solid heat carrier catalyst for thermal desorption of organic matter-contaminated soil for the current situation and existing problems of existing soil thermal desorption. Another objective of the present invention is to provide a method for preparing the above-mentioned catalyst and application thereof.

According to a solid heat carrier catalyst for thermal desorption of organic matter-contaminated soil, a hollow alumina ball prepared by 3D printing is taken as a solid heat carrier, copper-nickel-vanadium composite oxide is taken as a catalytic active component, and vinyltriethoxysilane is taken as a masking agent. An outer surface of the hollow alumina ball is masked with the vinyltriethoxysilane; then the hollow alumina ball is pierced to make an inner surface thereof connected with the outside through channels; the hollow alumina ball is then immersed in a catalytic active component precursor solution; and finally drying and calcination are performed to obtain the solid heat carrier catalyst for thermal desorption of organic matter-contaminated soil. Based on the mass of the carrier, the mass percentage content of the catalytic active component is 5% to 10%.

In the above-mentioned catalyst, the hollow alumina ball has a diameter of 20 mm to 100 mm and a thickness of 1 mm to 5 mm. The copper-nickel-vanadium composite oxide is copper oxide, nickel oxide and vanadium oxide, and a mass ratio of the copper oxide to the nickel oxide to the vanadium oxide is 1:(0.1 to 1):(0.1 to 1).

In some specific technical solutions, the hollow alumina ball has a diameter of 30 mm to 60 mm and a thickness of 1 mm to 2 mm; the copper-nickel-vanadium composite oxide is the copper oxide, the nickel oxide and the vanadium oxide, and the mass ratio of the copper oxide to the nickel oxide and the vanadium oxide is 1:(0.2 to 0.6) and (0.4 to 0.8).

A method for preparing the above-mentioned catalyst is provided. The method for preparing the catalyst includes the following steps:

(1) Preparation of Solid Heat Carrier

Alumina powder, triethylene glycol diacrylate, and phenyl bis(2,4,6-trimethylbenzoyl)-phosphine oxide are dissolved in an organic solvent; stirring is performed in a dark room to obtain slurry; then the slurry is printed with a ceramic 3D printer, and synchronous photo-curing is performed by using a laser of the ceramic 3D printer, and after being obtained, the hollow alumina ball is placed in a muffle furnace for calcination to obtain the solid heat carrier.

Preferably, the organic solvent is ethylene glycol.

(2) Masking of Outer Surface of Solid Heat Carrier

The hollow alumina ball obtained in step (1) is placed in the vinyltriethoxysilane; the hollow alumina ball is immersed for 10 min, and then the immersed hollow alumina ball is taken out and placed in a drying oven for drying; then the hollow alumina ball with the outer surface masked is taken out; and the hollow alumina ball is pierced with a piercer to form at least two holes to make the inner surface thereof connected with the outside through channels to obtain a pierced hollow alumina ball with the outer surface masked.

(3) Preparation of Catalytic Active Component Precursor Solution

A copper salt, a nickel salt, a vanadium salt and citric acid monohydrate are weighed, and are added into deionized water, and stirring is performed in a water bath at 50° C. to 70° C. until the solution appears clear and transparent to obtain the active component precursor solution.

(4) Preparation of Catalyst

The pierced hollow alumina ball with the outer surface masked prepared in step (2) is immersed into the active component precursor ion solution prepared in step (3); after adsorption for 1 h to 3 h, the immersed pierced hollow alumina ball is placed in a blast drying oven for heat-preservation drying; and then the dried pierced hollow alumina ball is placed in a muffle furnace for calcination to obtain the solid heat carrier catalyst for thermal desorption of organic matter-contaminated soil.

In the above-mentioned method, a mass ratio of the alumina powder to the triethylene glycol diacrylate to the phenyl bis(2,4,6-trimethylbenzoyl)-phosphine oxide described in step (1) is (10 to 45):(10 to 54):(2 to 15).

In the above-mentioned method, the calcination temperature described in step (1) is 600° C. to 700° C., and the calcination time is 2 h to 4 h.

In the above-mentioned method, a mass ratio of the hollow alumina ball to the vinyltriethoxysilane described in step (2) is 1:(0.1 to 1); the drying temperature described in step (2) is 35° C. to 50° C., and the drying time is 2 h to 4 h; and a hole diameter of the holes is 3 mm to 8 mm.

In the above-mentioned method, the copper salt described in step (3) is copper nitrate or copper chloride dihydrate, the nickel salt is nickel nitrate hexahydrate or nickel chloride hexahydrate, and the vanadium salt is ammonium metavanadate.

In the above-mentioned method, the drying temperature described in step (4) is 80° C. to 100° C., and the drying time is 6 h to 10 h; and the calcination temperature in step (4) is 600° C. to 700° C., and the calcination time is 2 h to 4 h.

In the technical solution of the present invention, application of the above-mentioned catalyst to degradation of an organic contaminant in soil is provided, and the organic contaminant is benzo[A]anthracene.

In the above-mentioned method, the model of the ceramic 3D printer described in step (1) is CeraBuilder160Pro, and the supplier is the Suzhou Intelligent Laser Technology Co., Ltd. The printing rate described in step (1) is 5 cm²/h, and the laser power is 5 W.

In the above-mentioned method, the supplier of the piercer used for piercing is the Yueqing Liuwei Hardware Tools Co., Ltd.

Experimental conditions and results of thermal desorption of the present invention: One hollow alumina ball catalyst loaded with the active component is used as the catalyst by usage amount; 20 g to 200 g of soil containing 1% benzo[A]anthracene is loaded into the hollow ball catalyst, and the hollow ball catalyst is placed in an evaluation reaction device for catalyst performance. The inner diameter of a quartz tube in the evaluation reaction device is 31 mm to 61 mm, the soil heating temperature is 150° C. to 210° C., and the temperature of hot air introduced is 150° C. to 210° C., and the flow rate of the hot air is 20 mL/min to 50 mL/min. After thermal desorption at 180° C. for 20 min, the desorption effect of the benzo[A]anthracene can reach 100%.

Beneficial Effects

The catalyst prepared by the present invention has the following advantages:

(1) The hollow alumina ball has relatively high mechanical strength, the soil and the catalyst can be easily separated by oscillation after thermal desorption, while it is guaranteed that the catalyst is not damaged in the oscillation process.

(2) The copper-nickel-vanadium active component can catalyze the decomposition of the benzo[A]anthracene into small molecules, thereby greatly reducing the thermal desorption temperature of the benzo[A]anthracene.

(3) The alumina carrier in the catalyst has a synergistic catalytic effect with the copper-nickel-vanadium active component, thus improving the catalytic effect of the copper-nickel-vanadium active component.

(4) After the active component catalyzes the reaction of organic contaminants inside the hollow ball, since the decomposition reaction of the organic contaminant is an exothermic reaction, and the air inside the hollow ball can serve as a bad conductor of the heat while the hollow ball is a good conductor of the heat, the heat released from the catalytic reaction will cause the local temperature of the hollow ball catalyst to rise, and thus, the catalytic efficiency is improved, and the temperature rises and the reaction efficiency is improved, which in turn promote the positive cycle of the temperature rise.

(5) The vinyltriethoxysilane can serve as a masking agent to avoid that the active component precursor solution is loaded on the outer surface of the hollow alumina ball, thereby improving the utilization efficiency of the active component.

(6) As a photoinitiator, the phenyl bis(2,4,6-trimethylbenzoyl)-phosphine oxide initiates the polymerization of the triethylene glycol diacrylate under laser action, so that the formation of the alumina powder is promoted, and at the same time, the alumina powder is eliminated in the calcination process.

Therefore, the catalyst prepared by the present invention not only can greatly reduce the energy consumption of the thermal desorption of the soil and industrial thermal desorption costs, but also has environment-friendly components, a simple preparation process, relatively low cost, high cost-effectiveness and strong application and promotion value.

DETAILED DESCRIPTION

Figure 1:
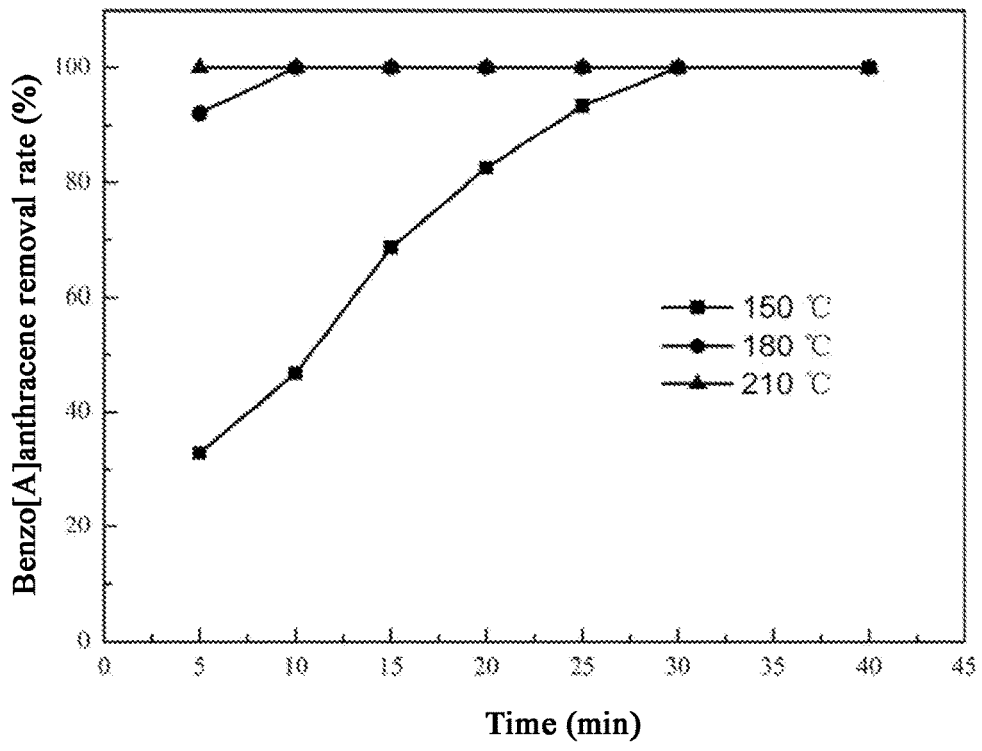
FIG. 1 is a performance diagram of a catalyst prepared in Example 1.
Figure 2:
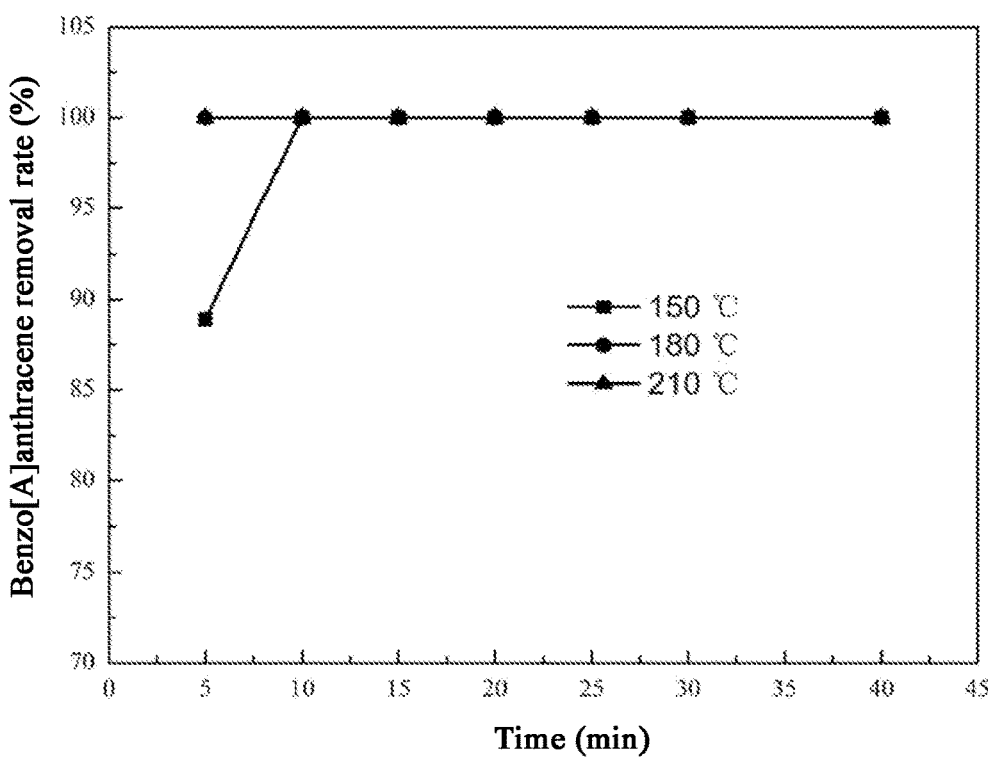
FIG. 2 is a performance diagram of a catalyst prepared in Example 2.
Figure 3:
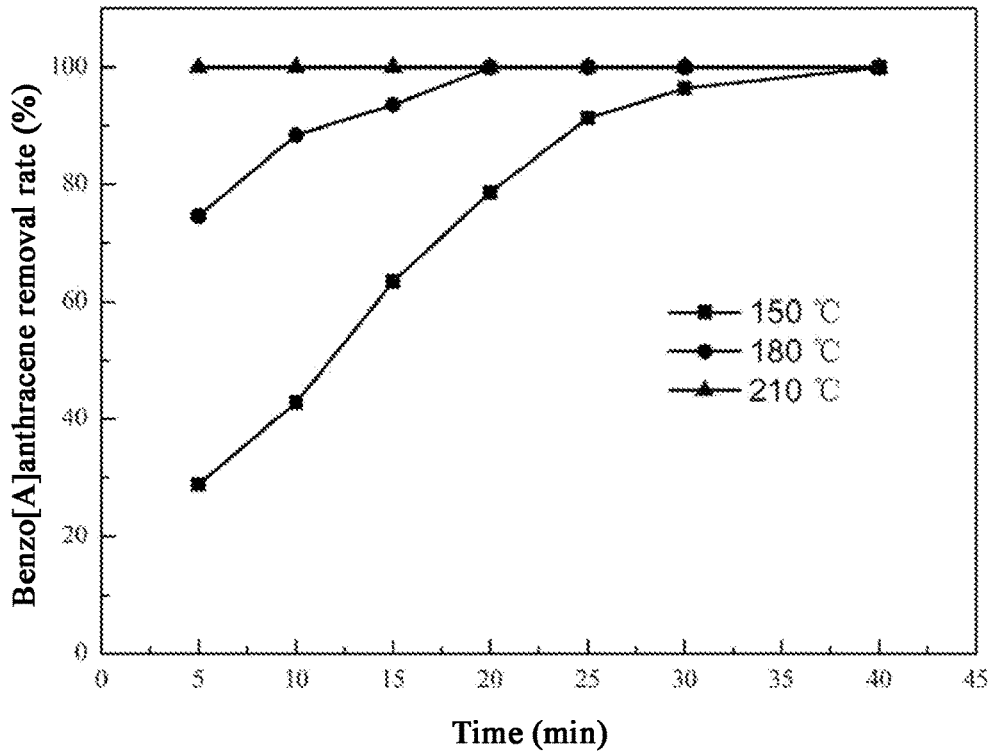
FIG. 3 is a performance diagram of a catalyst prepared in Example 3.
Figure 4:
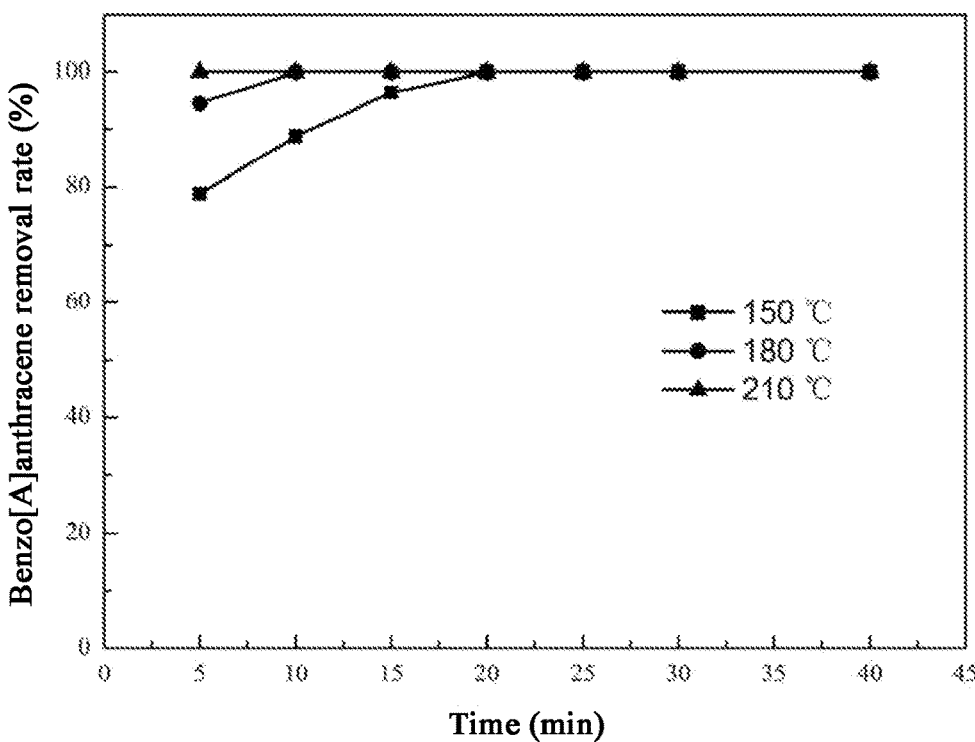
FIG. 4 is a performance diagram of a catalyst prepared in Example 4.
Figure 5:
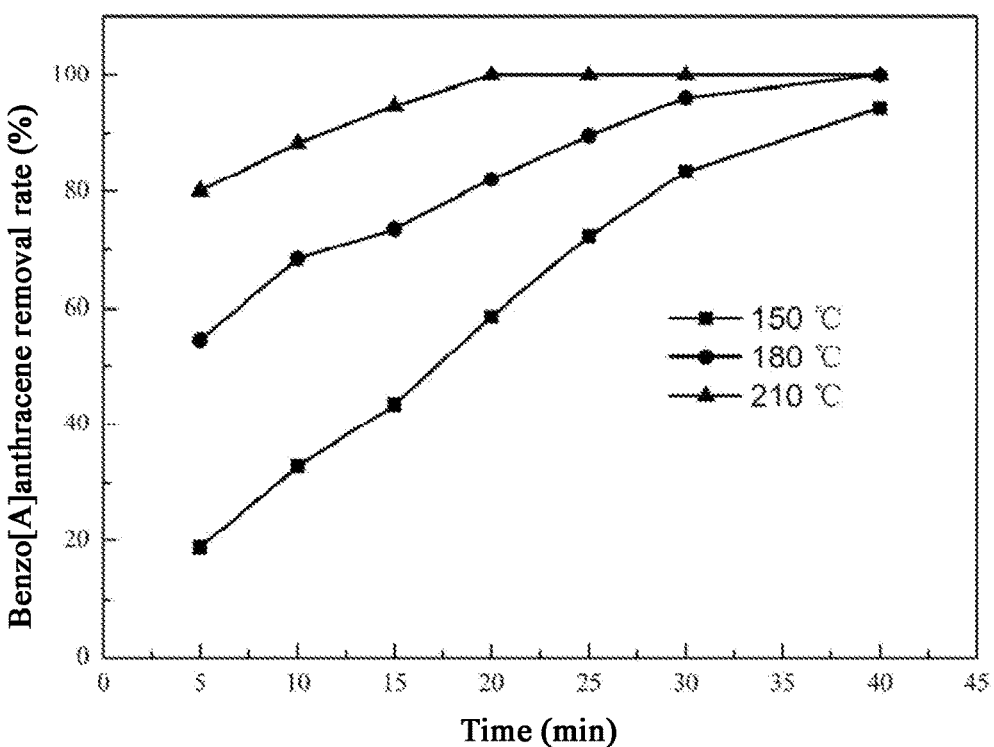
FIG. 5 is a performance diagram of a catalyst prepared in Comparative Example 2.
Figure 6:
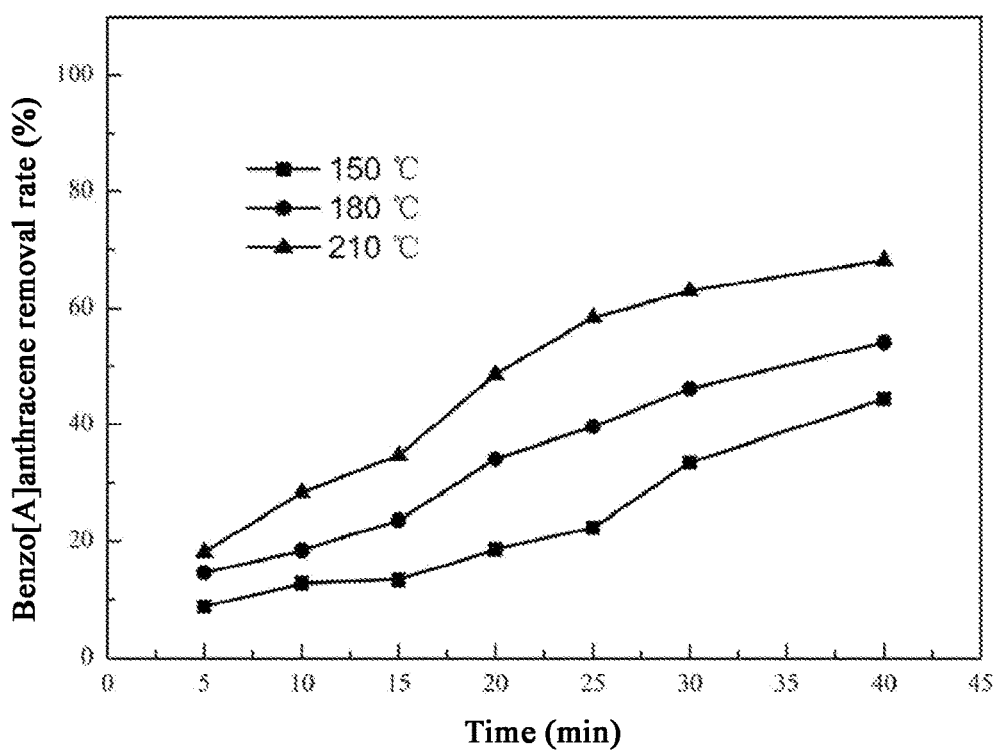
FIG. 6 is a performance diagram of a catalyst prepared in Comparative Example 3.
Figure 7:
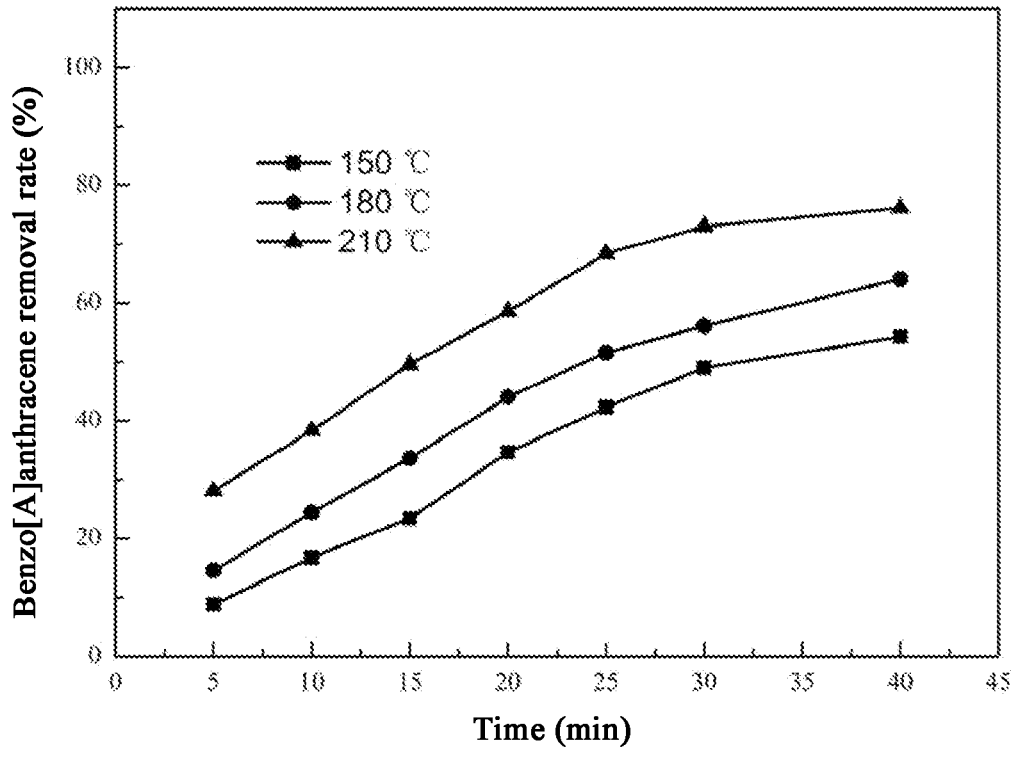
FIG. 7 is a performance diagram of a catalyst prepared in Comparative Example 4.

The present invention is further described below in conjunction with embodiments, but the scope of protection of the present invention is not limited thereto: Example 1

(1) Preparation of Solid Heat Carrier 10 g of alumina powder, 10 g of triethylene glycol diacrylate and 2 g of phenyl bis(2,4,6-trimethylbenzoyl)-phosphine oxide were weighed and dissolved in 16 g of ethylene glycol. Stirring was performed in a dark room at 25° C. for 2 h to obtain slurry. Then the slurry was printed with a ceramic 3D printer. The printing rate was 5 cm²/h. Synchronous photo-curing was performed by using a laser of the ceramic 3D printer. The laser power was 5 W. After being obtained, the hollow alumina ball with a diameter of 30 mm and a thickness of 1 mm was placed in a muffle furnace for calcination at 600° C. for 4 h to obtain the solid heat carrier (the mass of the carrier was 5.47 g).

(2) Masking of Outer Surface of Solid Heat Carrier

The hollow alumina ball obtained in step (1) was placed in 1.094 g of vinyltriethoxysilane. The hollow alumina ball was immersed for 10 min. Then the immersed hollow alumina ball was taken out and placed in a drying oven for drying at 35° C. for 4 h. Then the hollow alumina ball with the outer surface masked was taken out. The hollow alumina ball was pierced with a piercer to form two circular holes (the hole diameter of 6 mm) to make the inner surface thereof connected with the outside through channels to obtain a pierced hollow alumina ball with the outer surface masked.

(3) Preparation of Catalytic Active Component Precursor Solution

Based on the mass of the carrier, the mass percentage content of the catalytic active component was 5%. A mass ratio of copper oxide to nickel oxide to vanadium oxide in the catalytic active component was 1:0.2:0.8. 0.3224 g of copper nitrate, 0.1064 g of nickel nitrate hexahydrate, 0.1407 g of ammonium metavanadate and 0.6448 g of citric acid monohydrate were weighed, and were added into 3.224 g of deionized water. Stirring was performed in a water bath at 50° C. until the solution appeared clear and transparent to obtain the active component precursor solution.

(4) Preparation of Catalyst

The pierced hollow alumina ball with the outer surface masked prepared in step (2) was immersed into the active component precursor ion solution prepared in step (3). After adsorption for 1 h, the immersed pierced hollow alumina ball was placed in a blast drying oven for heat-preservation drying at 80° C. for 10 h. Then the dried pierced hollow alumina ball was placed in a muffle furnace for calcination at 600° C. for 4 h to obtain the solid heat carrier catalyst for thermal desorption of organic matter-contaminated soil.

(5) Catalytic Activity Test

One hollow alumina ball catalyst loaded with the active component was used as the catalyst by usage amount. 25 g of soil containing 1% benzo[A]anthracene was loaded into the hollow ball catalyst. The hollow ball catalyst was placed in an evaluation reaction device for catalyst performance. The inner diameter of a quartz tube in the evaluation reaction device was 31 mm. The soil heating temperature was 150° C. to 210° C. The temperature of hot air introduced was 150° C. to 210° C. The flow rate of the hot air was 20 mL/min. After thermal desorption at 180° C. for 10 min, the desorption effect of the benzo[A]anthracene could reach 100%.

Example 2

(1) Preparation of Solid Heat Carrier 15 g of alumina powder, 24 g of triethylene glycol diacrylate and 6 g of phenyl bis(2,4,6-trimethylbenzoyl)-phosphine oxide were weighed and dissolved in 24 g of ethylene glycol. Stirring was performed in a dark room at 35° C. for 1 h to obtain slurry. Then the slurry was printed with a ceramic 3D printer. The printing rate was 5 cm²/h. Synchronous photo-curing was performed by using a laser of the ceramic 3D printer. The laser power was 5 W. After being obtained, the hollow alumina ball with a diameter of 30 mm and a thickness of 2 mm was placed in a muffle furnace for calcination at 700° C. for 4 h to obtain the solid heat carrier (the mass of the carrier was 10.57 g).

(2) Masking of Outer Surface of Solid Heat Carrier

The hollow alumina ball obtained in step (1) was placed in 3.171 g of vinyltriethoxysilane. The hollow alumina ball was immersed for 10 min. Then the immersed hollow alumina ball was taken out and placed in a drying oven for drying at 50° C. for 2 h. Then the hollow alumina ball with the outer surface masked was taken out. The hollow alumina ball was pierced with a piercer to form two circular holes (the hole diameter of 6 mm) to make the inner surface thereof connected with the outside through channels to obtain a pierced hollow alumina ball with the outer surface masked.

(3) Preparation of Catalytic Active Component Precursor Solution

Based on the mass of the carrier, the mass percentage content of the catalytic active component was 10%. TA mass ratio of copper oxide to nickel oxide to vanadium oxide in the catalytic active component was 1:0.4:0.6. 1.1328 g of copper chloride dihydrate, 0.6726 g of nickel chloride hexahydrate, 0.4079 g of ammonium metavanadate and 3.3984 g of citric acid monohydrate were weighed, and were added into 11.328 g of deionized water. Stirring was performed in a water bath at 70° C. until the solution appeared clear and transparent to obtain the active component precursor solution.

(4) Preparation of Catalyst

The pierced hollow alumina ball with the outer surface masked prepared in step (2) was immersed into the active component precursor ion solution prepared in step (3). After adsorption for 3 h, the immersed pierced hollow alumina ball was placed in a blast drying oven for heat-preservation drying at 100° C. for 6 h. Then the dried pierced hollow alumina ball was placed in a muffle furnace for calcination at 700° C. for 2 h to obtain the solid heat carrier catalyst for thermal desorption of organic matter-contaminated soil.

(5) Catalytic Activity Test

One hollow alumina ball catalyst loaded with the active component was used as the catalyst by usage amount. 20 g of soil containing 1% benzo[A]anthracene was loaded into the hollow ball catalyst. The hollow ball catalyst was placed in an evaluation reaction device for catalyst performance. The inner diameter of a quartz tube in the evaluation reaction device was 31 mm. The soil heating temperature was 150° C. to 210° C. The temperature of hot air introduced was 150° C. to 210° C. The flow rate of the hot air was 50 mL/min. After thermal desorption at 150° C. for 10 min, the desorption effect of the benzo[A]anthracene could reach 100%.

Example 3

(1) Preparation of Solid Heat Carrier 25 g of alumina powder, 20 g of triethylene glycol diacrylate and 5 g of phenyl bis(2,4,6-trimethylbenzoyl)-phosphine oxide were weighed and dissolved in 30 g of ethylene glycol. Stirring was performed in a dark room at 35° C. for 2 h to obtain slurry. Then the slurry was printed with a ceramic 3D printer. The printing rate was 5 cm²/h. Synchronous photo-curing was performed by using a laser of the ceramic 3D printer. The laser power was 5 W. After being obtained, the hollow alumina ball with a diameter of 60 mm and a thickness of 1 mm was placed in a muffle furnace for calcination at 700° C. for 2 h to obtain the solid heat carrier (the mass of the carrier was 22.24 g).

(2) Masking of Outer Surface of Solid Heat Carrier

The hollow alumina ball obtained in step (1) was placed in 4.448 g of vinyltriethoxysilane. The hollow alumina ball was immersed for 10 min. Then the immersed hollow alumina ball was taken out and placed in a drying oven for drying at 50° C. for 4 h. Then the hollow alumina ball with the outer surface masked was taken out. The hollow alumina ball was pierced with a piercer to form two circular holes (the hole diameter of 6 mm) to make the inner surface thereof connected with the outside through channels to obtain a pierced hollow alumina ball with the outer surface masked.

(3) Preparation of Catalytic Active Component Precursor Solution

Based on the mass of the carrier, the mass percentage content of the catalytic active component was 5%. A mass ratio of copper oxide to nickel oxide to vanadium oxide in the catalytic active component was 1:0.4:0.6. 1.1918 g of copper chloride dihydrate, 0.8656 g of nickel nitrate hexahydrate, 0.4291 g of ammonium metavanadate and 2.9795 g of citric acid monohydrate were weighed, and were added into 11.918 g of deionized water. Stirring was performed in a water bath at 60° C. until the solution appeared clear and transparent to obtain the active component precursor solution.

(4) Preparation of Catalyst

The pierced hollow alumina ball with the outer surface masked prepared in step (2) was immersed into the active component precursor ion solution prepared in step (3). After adsorption for 2 h, the immersed pierced hollow alumina ball was placed in a blast drying oven for heat-preservation drying at 90° C. for 8 h. Then the dried pierced hollow alumina ball was placed in a muffle furnace for calcination at 650° C. for 3 h to obtain the solid heat carrier catalyst for thermal desorption of organic matter-contaminated soil.

(5) Catalytic Activity Test

One hollow alumina ball catalyst loaded with the active component was used as the catalyst by usage amount. 200 g of soil containing 1% benzo[A]anthracene was loaded into the hollow ball catalyst. The hollow ball catalyst was placed in an evaluation reaction device for catalyst performance. The inner diameter of a quartz tube in the evaluation reaction device was 61 mm. The soil heating temperature was 150° C. to 210° C. The temperature of hot air introduced was 150° C. to 210° C. The flow rate of the hot air was 30 mL/min. After thermal desorption at 180° C. for 20 min, the desorption effect of the benzo[A]anthracene could reach 100%.

Example 4

(1) Preparation of Solid Heat Carrier 45 g of alumina powder, 54 g of triethylene glycol diacrylate and 15 g of phenyl bis(2,4,6-trimethylbenzoyl)-phosphine oxide were weighed and dissolved in 90 g of ethylene glycol. Stirring was performed in a dark room at 35° C. for 2 h to obtain slurry. Then the slurry was printed with a ceramic 3D printer. The printing rate was 5 cm²/h. Synchronous photo-curing was performed by using a laser of the ceramic 3D printer. The laser power was 5 W. After being obtained, the hollow alumina ball with a diameter of 60 mm and a thickness of 2 mm was placed in a muffle furnace for calcination at 600° C. for 2 h to obtain the solid heat carrier (the mass of the carrier was 43.75 g).

(2) Masking of Outer Surface of Solid Heat Carrier

The hollow alumina ball obtained in step (1) was placed in 10.94 g of vinyltriethoxysilane. The hollow alumina ball was immersed for 10 min. Then the immersed hollow alumina ball was taken out and placed in a drying oven for drying at 50° C. for 4 h. Then the hollow alumina ball with the outer surface masked was taken out. The hollow alumina ball was pierced with a piercer to form two circular holes (the hole diameter of 6 mm) to make the inner surface thereof connected with the outside through channels to obtain a pierced hollow alumina ball with the outer surface masked.

(3) Preparation of Catalytic Active Component Precursor Solution

Based on the mass of the carrier, the mass percentage content of the catalytic active component was 10%. A mass ratio of copper oxide to nickel oxide to vanadium oxide in the catalytic active component was 1:0.2:0.8. 5.1578 g of copper nitrate, 1.7028 g of nickel nitrate hexahydrate, 2.2511 g of ammonium metavanadate and 10.3156 g of citric acid monohydrate were weighed, and were added into 51.578 g of deionized water. Stirring was performed in a water bath at 60° C. until the solution appeared clear and transparent to obtain the active component precursor solution.

(4) Preparation of Catalyst

The pierced hollow alumina ball with the outer surface masked prepared in step (2) was immersed into the active component precursor ion solution prepared in step (3). After adsorption for 2 h, the immersed pierced hollow alumina ball was placed in a blast drying oven for heat-preservation drying at 90° C. for 8 h. Then the dried pierced hollow alumina ball was placed in a muffle furnace for calcination at 650° C. for 3 h to obtain the solid heat carrier catalyst for thermal desorption of organic matter-contaminated soil.

(5) Catalytic Activity Test

One hollow alumina ball catalyst loaded with the active component was used as the catalyst by usage amount. 200 g of soil containing 1% benzo[A]anthracene was loaded into the hollow ball catalyst. The hollow ball catalyst was placed in an evaluation reaction device for catalyst performance. The inner diameter of a quartz tube in the evaluation reaction device was 61 mm. The soil heating temperature was 150° C. to 210° C. The temperature of hot air introduced was 150° C. to 210° C. The flow rate of the hot air was 30 mL/min. After thermal desorption at 150° C. for 20 min, the desorption effect of the benzo[A]anthracene could reach 100%.

Comparative Example 1

(1) Preparation of Catalyst

Except that the phenyl bis(2,4,6-trimethylbenzoyl)-phosphine oxide was not used as a photoinitiator during the preparation of the catalyst, other conditions were the same as those in Example 1.

(2) Comparison Effect

Compared with those in Example 1, the phenyl bis(2,4,6-trimethylbenzoyl)-phosphine oxide was not used as the photoinitiator during the preparation of the catalyst, and a 3D printed hollow alumina ball could not be formed.

Comparative Example 2

(1) Preparation of Catalyst

Except that the vinyltriethoxysilane was not used as the outer surface masking agent during the preparation of the catalyst, other conditions were the same as those in Example 2.

(2) Catalytic Activity Test

One hollow alumina ball catalyst loaded with the active component was used as the catalyst by usage amount. 20 g of soil containing 1% benzo[A]anthracene was loaded into the hollow ball catalyst. The hollow ball catalyst was placed in an evaluation reaction device for catalyst performance. The inner diameter of a quartz tube in the evaluation reaction device was 31 mm. The soil heating temperature was 150°

C. to 210° C. The temperature of hot air introduced was 150° C. to 210° C. The flow rate of the hot air was 50 mL/min. After thermal desorption at 150° C. for 10 min, the desorption effect of the benzo[A]anthracene could reach 32.8%, and after thermal desorption at 210° C. for 20 min, the desorption effect of the benzo[A]anthracene could reach 100%.

(3) Comparison Effect

Compared with those in Example 2, the vinyltriethoxysilane was not used as the outer surface masking agent during the preparation of the catalyst, and at the same time, the active components were loaded on inner and outer surfaces of the hollow ball, while active sites on the outer surface could not contact the organic contaminant in the soil, thereby resulting in a significant decline in catalytic activity.

Comparative Example 3

(1) Preparation of Catalyst

Except that the copper chloride dihydrate was not added during the preparation of the catalyst, other conditions are the same as those in Example 3.

(2) Catalytic Activity Test

One hollow alumina ball catalyst loaded with the active component was used as the catalyst by usage amount. 200 g of soil containing 1% benzo[A]anthracene was loaded into the hollow ball catalyst. The hollow ball catalyst was placed in an evaluation reaction device for catalyst performance. The inner diameter of a quartz tube in the evaluation reaction device was 61 mm. The soil heating temperature was 150° C. to 210° C. The temperature of hot air introduced was 150° C. to 210° C. The flow rate of the hot air was 30 mL/min. After thermal desorption at 180° C. for 20 min, the desorption effect of the benzo[A]anthracene reached 34%.

(3) Comparison Effect

Compared with those in Example 3, the copper chloride dihydrate was not used during the preparation of the catalyst, and the active component lacked copper oxide with high oxidability, thereby resulting in a significant decrease in catalytic activity.

Comparative Example 4

(1) Preparation of Catalyst

Except that the ammonium metavanadate was not added during the preparation of the catalyst, other conditions are the same as those in Example 4.

(2) Catalytic Activity Test

One hollow alumina ball catalyst loaded with the active component was used as the catalyst by usage amount. 200 g of soil containing 1% benzo[A]anthracene was loaded into the hollow ball catalyst. The hollow ball catalyst was placed in an evaluation reaction device for catalyst performance. The inner diameter of a quartz tube in the evaluation reaction device was 61 mm. The soil heating temperature was 150° C. to 210° C. The temperature of hot air introduced was 150° C. to 210° C. The flow rate of the hot air was 30 mL/min. After thermal desorption at 150° C. for 30 min, the desorption effect of the benzo[A]anthracene reached 49%.

(3) Comparison Effect

Compared with those in Example 4, the ammonium metavanadate was not used during the preparation of the catalyst, and the active component lacked vanadium pentoxide with excellent reducibility, thereby resulting in a significant decrease in catalytic activity.

What is claimed is:

1. A method for preparing a solid heat carrier catalyst comprising the following steps:

(1) preparing a solid heat carrier by
    dissolving alumina powder, triethylene glycol diacrylate, and phenyl bis(2,4,6-trimethylbenzoyl)-phosphine oxide in an organic solvent;
    performing stirring in a dark room to obtain a slurry;
    then printing the slurry with a ceramic 3D printer, and performing synchronous photo-curing by using a laser of the ceramic 3D printer, to obtain a hollow alumina ball; and
    after obtaining the hollow alumina ball, placing the hollow alumina ball in a muffle furnace for calcination to obtain the solid heat carrier;

(2) preparing a pierced hollow alumina ball with the outer surface masked by
    placing the hollow alumina ball obtained in step (1) in vinyltriethoxysilane to immerse the hollow alumina ball therein, and then removing the hollow alumina ball from the vinyltriethoxysilane and placing the removed hollow alumina ball in a drying oven for drying to obtain a hollow alumina ball with the outer surface masked;
    then piercing the hollow alumina ball with the outer surface masked with a piercer to form at least two holes to make an inner surface thereof connected with the outside through channels to obtain a pierced hollow alumina ball with the outer surface masked;

(3) preparing a catalytic active component precursor solution by weighing copper salt, nickel salt, vanadium salt and citric acid monohydrate, adding the same into deionized water and stirring in a water bath at 50° C. to 70° C. to obtain the catalytic active component precursor solution; and (4) preparing the solid heat carrier catalyst by
    immersing the pierced hollow alumina ball with the outer surface masked prepared in step (2) into the catalytic active component precursor solution prepared in step (3);
    after adsorption for 1 h to 3 h, placing the immersed pierced hollow alumina ball in a blast drying oven for heat-preservation drying; and then
    placing the dried pierced hollow alumina ball in a muffle furnace for calcination to obtain the solid heat carrier catalyst.

2. The method according to claim 1, wherein a mass ratio of the alumina powder to the triethylene glycol diacrylate to the phenyl bis(2,4,6-trimethylbenzoyl)-phosphine oxide described in step (1) is (10 to 45):(10 to 54):(2 to 15).

3. The method according to claim 1, wherein a temperature of the calcination described in step (1) is 600° C. to 700° C., and the Calcination time is 2 h to 4 h.

4. The method according to claim 1, wherein a mass ratio of the hollow alumina ball to the vinyltriethoxysilane described in step (2) is 1:(0.1 to 1); the drying temperature described in step (2) is 35° C. to 50° C., and the drying time is 2 h to 4 h; and a hole diameter of the holes in the pierced hollow alumina ball with the outer surface masked is 3 to 8 mm.

5. The method according to claim 1, wherein the copper salt described in step (3) is copper nitrate or copper chloride dihydrate, the nickel salt is nickel nitrate hexahydrate or nickel chloride hexahydrate, and the vanadium salt is ammonium metavanadate.

6. The method according to claim 1, wherein the drying temperature described in step (4) is 80° C. to 100° C., and the drying time is 6 h to 10 h; and the calcination temperature in step (4) is 600° C. to 700° C., and the calcination time is 2 h to 4 h.

7. A method of decomposing an organic contaminant in soil, comprising contacting soil containing the organic contaminant with the solid heat carrier catalyst obtained in claim 1, wherein the organic contaminant is benzo[A]anthracene.

8. The method according to claim 1, wherein the organic solvent is ethylene glycol.

9. A solid heat carrier catalyst for thermal desorption of organic matter-contaminated soil prepared according to the method of claim 1.

* * * * *